(12) United States Patent
Kim et al.

(10) Patent No.: US 8,541,119 B2
(45) Date of Patent: Sep. 24, 2013

(54) LITHIUM SECONDARY BATTERY AND METHOD OF CONTROLLING SHORT RESISTANCE THEREOF

(75) Inventors: Joong-Heon Kim, Yongin-si (KR); Cheol-Ho Park, Yongin-si (KR); Jin-Uk Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 405 days.

(21) Appl. No.: 12/910,636

(22) Filed: Oct. 22, 2010

(65) Prior Publication Data

US 2011/0143174 A1 Jun. 16, 2011

(30) Foreign Application Priority Data

Dec. 14, 2009 (KR) .................. 10-2009-0124208

(51) Int. Cl.
*H01M 10/48* (2006.01)
*H01M 10/056* (2010.01)

(52) U.S. Cl.
USPC .............................. 429/50; 429/90

(58) Field of Classification Search
USPC ..................... 429/50, 307–323, 90
See application file for complete search history.

(56) References Cited

U.S. PATENT DOCUMENTS

| | | |
|---|---|---|
| 6,849,362 B2 | 2/2005 | Noh |
| 7,160,648 B2 | 1/2007 | Noh |
| 7,745,053 B2 | 6/2010 | Lee et al. |
| 2006/0240326 A1 | 10/2006 | Lee et al. |
| 2007/0275302 A1* | 11/2007 | Sotowa et al. ............. 429/217 |
| 2009/0317723 A1 | 12/2009 | Yu et al. |
| 2010/0159327 A1 | 6/2010 | Lee et al. |
| 2011/0193014 A1 | 8/2011 | Sotowa et al. |

FOREIGN PATENT DOCUMENTS

| | | |
|---|---|---|
| CN | 1855604 A | 11/2006 |
| CN | 101373827 A | 2/2009 |
| EP | 1414096 * | 4/2004 |
| EP | 1414096 A1 | 4/2004 |
| EP | 1715542 * | 4/2006 |
| EP | 1715542 A1 | 10/2006 |
| EP | 1758199 * | 2/2007 |
| EP | 1758199 A2 | 2/2007 |
| JP | 2006-302885 A | 11/2006 |
| JP | 2007-018882 A | 1/2007 |
| KR | 10-2001-0039430 A | 5/2001 |
| KR | 10-2001-0048267 A | 6/2001 |
| KR | 2003-0042792 A | 6/2003 |
| KR | 10-2006-0110635 A | 10/2005 |
| KR | 10-2008-0010944 A | 1/2008 |

OTHER PUBLICATIONS

Extended European Search Report issued by the European Patent Office dated Mar. 28, 2011, 6 pages.

(Continued)

*Primary Examiner* — Carlos Barcena
*Assistant Examiner* — Michael Dignan
(74) *Attorney, Agent, or Firm* — Knobbe Martens Olson & Bear, LLP

(57) ABSTRACT

Provided is a lithium secondary battery including a positive electrode having a positive electrode active material, a negative electrode having a negative electrode active material, and a polymer electrolyte composition having a polymer electrolyte, a non-aqueous organic solvent, and a lithium salt. The content of the polymer electrolyte is 9 to 20 wt %, based on the total weight of the polymer electrolyte composition.

8 Claims, 8 Drawing Sheets

(56) References Cited

OTHER PUBLICATIONS

Korean Office Action issued in the corresponding Korean Patent Application No. 10-2009-0124208 dated Mar. 15, 2012, 6 pages.
Korean Office Action dated Aug. 4, 2011 in corresponding Korean Patent Application No. 10-2009-0124208, 6 pages.
European Office Action issued by the European Patent Office dated Jun. 19, 2012, 5 pages.
Office Action dated Feb. 22, 2013, issued in connection with corresponding Chinese Patent Application No. 201010593430.0.
Office Action dated Mar. 19, 2013, issued in connection with corresponding Japanese Patent Application No. 2010-093175.

\* cited by examiner

LITHIUM SECONDARY BATTERY AND METHOD OF CONTROLLING SHORT RESISTANCE THEREOF

CROSS-REFERENCE TO RELATED APPLICATIONS

This application claims the benefit of Korean Patent Application No. 10-2009-0124208, filed Dec. 14, 2009 in the Korean Intellectual Property Office, the disclosure of which is incorporated herein by reference.

BACKGROUND

1. Field

Aspects of the present invention relate to a lithium secondary battery and a method of controlling a short resistance thereof.

2. Description of the Related Technology

Due to the recent rapid development of compact and lightweight portable electronic devices, there is a growing demand for more compact and higher-capacity batteries as a driving power source thereof. Particularly, lithium secondary batteries have an operating voltage of 3.6 V or more, which is three times higher than the operating voltages of nickel-cadmium (Ni—Cd) batteries or nickel-metal hydride (Ni-MH) batteries, which are widely used as a power source of portable electronic devices. Further, lithium secondary batteries have a higher energy density per unit weight than Ni—Cd and Ni-MH batteries. For these reasons, the lithium secondary batteries have been rapidly developed.

A lithium secondary battery stores and releases electric energy by oxidation and reduction, when lithium ions are intercalated/deintercalated at a positive electrode and a negative electrode. A lithium secondary battery is manufactured using materials capable of reversibly intercalating and deintercalating lithium ions as active materials for the positive and negative electrodes, by charging an organic electrolyte or polymer electrolyte disposed between the positive electrode and the negative electrode.

A lithium secondary battery includes an electrode assembly, a can, and a cap assembly. The electrode assembly is formed in a jelly-roll shape, by winding a negative electrode, a positive electrode, and a separator disposed therebetween. The can houses the electrode assembly and an electrolyte. The cap assembly is assembled on the can.

Meanwhile, such a lithium secondary battery is charged or discharged by an electrochemical reaction occurring when ions are released, inserted, or moved between active materials of the electrodes. A repeatedly charged or discharged secondary battery may undergo an increase in internal pressure and heat, due to electrical misuse (overcharging) or other dangers. When such a state continues, the secondary battery may break or explode, thereby causing harm to a user. Thus, it is essential to prepare safety features to prevent this harm.

For example, a conventional secondary battery has a means for inhibiting a reaction, so that when an internal pressure is increased over a safe pressure, it blocks the conformation of an electric circuit, or breaks a safety vent in response to the pressure, thereby reducing the internal pressure and removing an electrolyte. An example of a conventional safety means is a porous separator installed between the positive electrode and the negative electrode. When a temperature in a case is increased over a safe temperature, the porous separator shuts pores down in response to the temperature, and inhibits movement of ions between the electrodes. In such a manner, the porous separator ensures safety, by inhibiting an electrochemical reaction (shut down).

However, when the temperature in the battery is excessively increased over a temperature release rate of the case, due to non-uniformity of the separator or other internal short circuits, the separator melts before the shut down occurs. As such, the separator is prevented from insulating the positive electrode from the negative electrode. In addition, when the positive electrode and the negative electrode are short-circuited, a chain reaction, including the decomposition of the negative electrode active material, the electrolyte, and the positive electrode active material (melt-down) occurs. As a result, a thermal runaway occurs, and the conventional secondary battery becomes unsafe and explodes.

Particularly, when a positive electrode collector and the negative electrode active material are short-circuited, such a melt-down phenomenon can bring a drastic increase in heating value, due to a resistance value at the short-circuited portion, and the occurrence of the thermal runaway. For this reason, an alternative for ensuring battery safety is needed.

SUMMARY OF CERTAIN INVENTIVE ASPECTS

Aspects of the present invention provide a lithium secondary battery, in which battery safety is ensured during a short circuit of the secondary battery.

According to one aspect of the present invention, a lithium secondary battery includes: a positive electrode including a positive electrode active material; a negative electrode including a negative electrode active material; and a polymer electrolyte composition including a polymer electrolyte, a non-aqueous organic solvent, and a lithium salt. Here, the content of the polymer electrolyte is 9 to 20 wt %, based on the total weight of the polymer electrolyte composition.

According to an aspect of the invention, the negative electrode may further include a binder formed of a styrene-butadiene rubber.

According to an aspect of the invention, the content of the polymer electrolyte may be 7 to 20 wt %, based on the total weight of the polymer electrolyte composition.

According to an aspect of the invention, the binder may be polyvinylidenefluoride.

According to another aspect of the present invention, a method of controlling a short resistance includes: measuring an open circuit voltage $V_{OC}$ of a secondary battery; calculating a short circuit resistance $R_{SC}$ using the open circuit voltage $V_{OC}$; calculating a heating value W according to time, using the short circuit resistance $R_{SC}$; and calculating a time having the maximum instantaneous heating value, using the change in heating value W according time. Here, the short circuit resistance $R_{SC}$ value at the time having the maximum instantaneous heating value is the critical short resistance.

According to an aspect of the invention, the critical short resistance may be present in a region excluding a "$R_{SC}$ range having an ignition risk."

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the exemplary embodiments, taken in conjunction with the accompanying drawings, of which.

DETAILED DESCRIPTION OF CERTAIN INVENTIVE EMBODIMENTS

Figure 1:
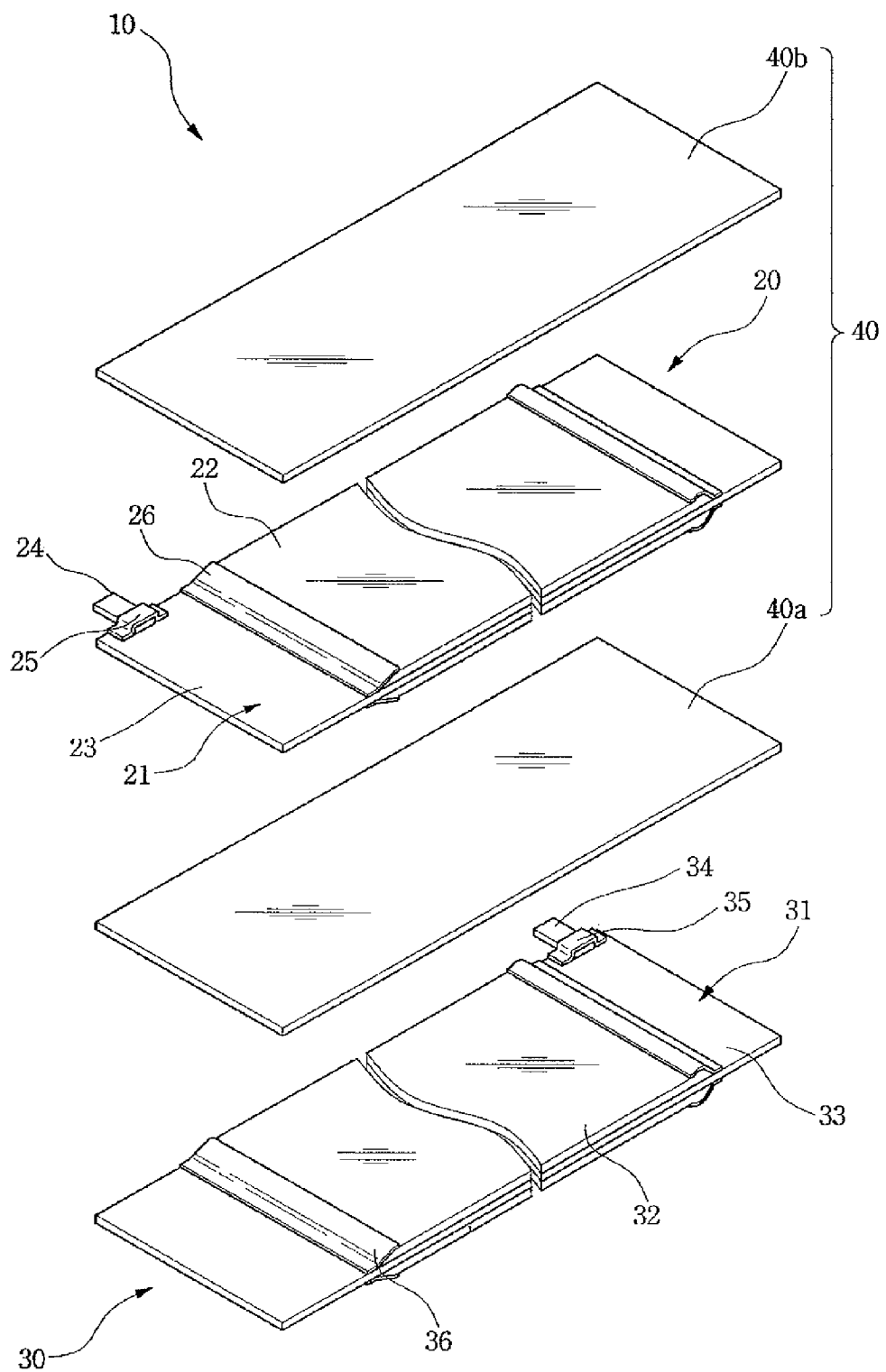
FIG. 1 is an exploded perspective view of an electrode assembly, according to an exemplary embodiment of the present invention.

Reference will now be made in detail to the exemplary embodiments of the present disclosure, examples of which are illustrated in the accompanying drawings, wherein like reference numerals refer to the like elements throughout. The exemplary embodiments are described below, in order to explain the present disclosure, by referring to the figures.

FIG. 1 is an exploded perspective view of an electrode assembly 10 according to an exemplary embodiment of the present invention. The electrode assembly 10 includes a first electrode 20 (referred to as a "positive electrode"), a second electrode 30 (referred to as a "negative electrode), and a separator 40. The electrode assembly 10 is formed in a jelly-roll shape, by stacking the positive electrode 20, the negative electrode 30, and the separator 40 and then winding the same together.

In the shown embodiment, the separator 40 includes a first separator 40a disposed between the positive and negative electrodes 20 and 30, and a second separator 40b disposed on the first electrode 20. However, it is understood that the second separator can be under or on both of the electrodes 20 and 30. The separator 40 is interposed between a contact portion of the electrodes 20 and 30, which are stacked and wound to prevent a short circuit between the electrodes 20 and 30.

The positive electrode 20 includes a positive collector 21 and a positive electrode active material layer 22. The positive collector 21 collects electrons generated by a chemical reaction and conducts the electrons to an external circuit. The positive electrode active material layer 22 is formed by applying a positive electrode slurry, including a positive electrode active material, to one or both sides of the positive electrode collector 21. As shown, the positive electrode slurry was applied to both sides of the positive current collector 21.

The positive electrode 20 includes a positive electrode non-coating portion 23, to which the positive electrode slurry is not applied, is formed on one or both ends of the positive electrode collector 21, thereby exposing the positive electrode collector 21. A positive electrode tab 24, transfers the electrons collected in the positive electrode collector 21 to an external circuit. The positive electrode tab 24 is formed of a nickel or aluminum thin film and is joined to the positive electrode non-coating portion 23. As shown, a protection member 25 is provided on the area to which the positive electrode tab 24 is joined to the noncoating portion 23.

The protection member 25 is provided to protect the joined area, so as to prevent a short circuit. As such, the protection member 25 can be formed of a material having resistance to heat, for example, a polymer resin such as polyester.

The positive electrode 20 may includes an insulating member 26 formed to cover one or both ends of the positive electrode active material layer 22. As shown, the insulating member 26 is on both ends of the positive electrode active material 22 and on both sides of the current collector 21.

The insulating member 26 may be formed of an insulating tape, or an adhesive layer and an insulating film adhered to one side thereof. However, the shape and material of the insulating member 26 is not limited thereto.

The negative electrode 30 includes a negative electrode collector 31 and a negative electrode active layer 32. The negative electrode collector 31 collects electrons generated by a chemical reaction and transfers the electrons to an external circuit. The negative electrode active material layer 32 is formed by applying a negative electrode slurry including a negative electrode active material, to one or both sides of the negative electrode collector 31. As shown, the slurry is applied to both sides of the collector 31.

A negative electrode non-coating portion 33, to which the negative electrode slurry is not applied, is formed on one or both ends of the negative electrode collector 31, thereby exposing the negative electrode collector 31.

A negative electrode tab 34 transfers the electrons collected in the negative electrode collector 31 to an external circuit. The negative electrode tab 34 is joined to the negative electrode non-coating portion 33. While not required, the tab 34 can be a nickel thin film.

A protection member 35 is on the area to which the negative electrode tab 34 is joined. The protection member 35 is provided to protect the joined area, so as to prevent a short circuit. The protection member 35 can be formed of a material having resistance to heat, for example, a polymer resin such as polyester.

The negative electrode 30 further includes an insulating member 36 formed to cover one or both ends of the negative electrode active material layer 32. As shown, the insulating member 36 is on both ends of the layer 36 and on both sides of the cement collector 31. The insulating member 36 may be formed of an insulating tape, or an adhesive layer and an insulating film adhered to one side thereof. However, the shape and material of the insulating member 36 are not limited thereto.

According to an aspect of the invention, the separator 40 may be formed of a resin layer, such as polyethylene or polypropylene, or a porous layer formed by combining a ceramic material with a binder. However, the material of the separator 40 is not limited thereto.

As described above, the positive electrode 20 includes the positive electrode active material layer 22 and the positive electrode collector 21 to which the positive electrode active material is applied. The positive electrode collector 21 may be formed of aluminum or an aluminum alloy, and the positive electrode active material layer 22 includes a positive electrode active material capable of reversibly intercalating lithium ions. Examples of the positive electrode active materials may be selected from the group consisting of materials represented by Chemical Formulae 1 to 12:

$Li_xMn_{1-y}M_yC_2$;  [Chemical Formula 1]

$Li_xMn_{1-y}M_yO_{2-z}D_z$;  [Chemical Formula 2]

$Li_xMn_2O_{4-z}D_z$;  [Chemical Formula 3]

$Li_xCo_{1-y}M_yC_2$;  [Chemical Formula 4]

$Li_xCo_{1-y}M_yO_{2-z}D_z$;  [Chemical Formula 5]

$Li_xNi_{1-y}M_yC_2$;  [Chemical Formula 6]

$Li_xNi_{1-y}M_yO_{2-z}C_z$;  [Chemical Formula 7]

$Li_xNi_{1-y}Co_yO_{2-z}D_z$;  [Chemical Formula 8]

$Li_xNi_{1-y-z}Co_yM_zC_\alpha$;  [Chemical Formula 9]

$Li_xNi_{1-y-z}Co_yM_zO_{2-\alpha}D_\alpha$;  [Formula 10]

$Li_xNi_{1-y-z}Mn_yM_zC_\alpha$; and  [Chemical Formula 11]

$Li_xNi_{1-y-z}Mn_yM_zO_{2-\alpha}D_\alpha$.  [Chemical Formula 12]

In these formulae: $0.90 \leq x \leq 1.1$; $0 \leq y \leq 0.5$; $0 \leq z \leq 0.5$; $0 \leq \alpha \leq 2$; M is at least one element selected from the group consisting of Al, Ni, Co, Mn, Cr, Fe, Mg, Sr, V, and rare-earth elements; C is an element selected from the group consisting of O, F, S and P; and D is F, S, or P.

As described above, the negative electrode 30 includes the negative electrode active material layer 32, and the negative electrode collector 31, to which the negative electrode active material is applied. The negative electrode collector 31 may be copper or a copper alloy. The negative electrode active material layer 32 may be formed of a carbon-based negative electrode active material including crystalline or amorphous carbon, or a carbon complex, or a metallic negative electrode active material including a metal material capable of alloying with lithium.

The positive and negative electrodes 20, 30 may be formed using a general electrode formation method. In particular, an electrode is generally formed by preparing an active material composition, by mixing a corresponding active material, a conductive agent, and a binder in a solvent, and applying the composition to an electrode collector. Since the method of forming an electrode is well known in the art, a detailed description thereof will be omitted herein.

The conductive agent may be a graphite-based conductive agent, a carbon black-based conductive agent, and a metal or metal compound-based conductive agent or a combination thereof. Examples of the graphite-based conductive agent may include artificial graphite, and natural graphite. Examples of the carbon black-based conductive agent may include acetylene black, ketjen black, denka black, thermal black, and channel black, and examples of the metal or metal compound-based conductive agent may include tin, tin oxide, $SnPO_4$, titanium oxide, potassium titanate, and a perovskite material, such as $LaSrCoO_3$ and $LaSrMnO_3$.

The content of the conductive agent may be 0.1 to 10 wt % of the total weight of positive electrode active material. When the content of the conductive agent is less than 0.1 wt %, electrochemical characteristics are degraded. When the content of the conductive agent is more than 10 wt %, the energy density per weight is reduced.

The binder adheres the active material a paste to the collector, improves the cohesion of the active material, and buffers the expansion and contraction of the active material. Examples of the binder may include polyvinylidenefluoride, poly(vinylacetate), polyvinylalcohol, polyethyleneoxide, polyvinylpyrrolidone, alkylated polyethyleneoxide, polyvinylether, poly(methylmethacrylate), poly(ethylacrylate), polytetrafluoroethylene, polyvinylchloride, polyacrylonitrile, polyvinylpyridine, styrene-butadiene rubber, and acrylonitrile-butadiene rubber. The binder may be polyvinylidenefluoride or styrene-butadiene rubber. A content of the binder may be 0.1 to 30 wt %, and specifically 1 to 10 wt %, of the total weight of the electrode active material. When the content of the binder is too low, adhesion between the electrode active material and the collector may become insufficient. When the content of the binder is too high, the content of the electrode active material is decreased, which is unfavorable in ensuring a battery with a higher capacity.

A solvent is used to disperse the electrode active material, the binder, and the conductive agent. For example, a non-aqueous solvent or an aqueous solvent may be used. Examples of the non-aqueous solvent may include N-methyl-2-pyrrolidone (NMP), dimethylformamide, dimethylacetamide, N,N-dimethylaminopropylamine, ethyleneoxide, and tetrahydrofuran.

Further, the secondary battery including the electrode assembly 10 having the separator 40 includes a polymer electrolyte composition. The polymer electrolyte composition includes a polymer electrolyte. The polymer electrolyte includes a polymer formed by polymerizing a first monomer of Chemical Formula 13, or a mixed monomer formed of the first monomer of Chemical Formula 13 and at least one selected from the group consisting of second monomers of Chemical Formulae 14 to 19.

A-polyesterpolyol-B  [Chemical Formula 13]

In Chemical Formula 13, the polyesterpolyol is a material having a molecular weight of 100 to 10,000,000, which is prepared by a condensation reaction between at least one alcohol derivative having 2 to 6 terminal OH groups, at least one dicarboxylic acid derivative, and A and B are materials reacting with a terminal OH group of polyesterpolyol, which are independently selected from $CH_2=CR-C(=O)-$, $CH_2=CR-C-CH_2-$, $CH_2=CR-$, $CH_2=CR-O-C(=O)-$, $CH_2=CH-CH_2-O-$, $CH_2=CH-S(=O)_2-$, and $CH_2=CR-C(=O)-O-CH_2CH_2-NH-C(=O)-$. In the forgoing formulae, R is $C_1$-$C_{10}$ hydrocarbon or $C_6$-$C_{10}$ aromatic hydrocarbon. Chemical Formulae 14 to 19 are as follows:

$CH_2=CR1-C(=O)-O-X$;  [Chemical Formula 14]

$CH_2=CR1-O-X$;  [Chemical Formula 15]

$CH_2=CR1—O—C(=O)—X;$ [Chemical Formula 16]

$CH_2=CH—CH_2—O—X;$ [Chemical Formula 17]

$CH_2=CH—S(=O)_2—X;$ and [Chemical Formula 18]

$CH_2=CR1-C(=O)—O—CH_2CH_2—NH—C(=O)—O—X.$ [Chemical Formula 19]

In Chemical Formulae 14 to 19, R1 is H, a $C_1-C_{10}$ hydrocarbon, or an aromatic hydrocarbon. X is a $C_1-C_{20}$ hydrocarbon, a halogenated hydrocarbon, an aromatic hydrocarbon, or a halogenated aromatic hydrocarbon.

In further detail, in Chemical Formula 13, the alcohol derivative forming polyesterpolyol is selected from the group consisting of polyethyleneglycol, polypropyleneglycol, alkanediol, ethoxylated alkanediol, propoxylated alkanediol, trimethylolpropane, ethoxylated trimethylolpropane, propoxylated trimethylolpropane, ditrimethylolpropane, ethoxylated ditrimethylolpropane, propoxylated ditrimethylolpropane, pentaerythritol, ethoxylated pentaerythritol, propoxylated pentaerythritol, dipentaerythritol, ethoxylated dipentaerythritol, propoxylated dipentaerythritol, bisphenol A, ethoxylated bisphenol A, and propoxylated bisphenol A.

An example of the polyesterpolyol may be a compound of Chemical Formula 20:

[Chemical Formula 20]

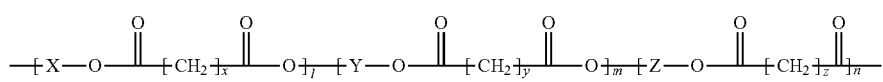

In Chemical Formula 20, X, Y, and Z are each one or more repeating units independently selected from the group consisting of a multi-valent alkylene oxide, and alkylene imide, and an alkylene. Further, x, y, and z are independently an integer of from 1 to 20, and l, m, and n are independently 0, 1, or more, which may be appropriately determined by the molecular weight of a desired polymer.

In Chemical Formula 13, A and B are independently selected from the group consisting of (meth)acryl, vinyl, allyl, vinylsulfonyl, and urethane(meth)acryl. In particular, A and B may be independently selected from (meth)acryl, vinyl, vinylsulfonyl, and urethane(meth)acryl.

Hereinafter, a synthesis example of a monomer of the polymer electrolyte, according to aspects of the present invention, will be described. However, the present invention is not limited thereto.

Monomer Synthesis Example 1

A mixed solution is prepared by stirring: 0.02 mol of polyester polyol (DR1515, "DAERYUNG Enterprise Co. Ltd.", Mn=1500), obtained by a condensation reaction of ethylene glycol (EG), diethylene glycol (DEG), trimethylolpropane (TMP), and adipic acid; 30 g of methylene chloride as a reaction solvent; and 0.04 mol of triethylamine as a catalyst, in a cooling bath. Another mixed solution of 0.04 mol of acryloyl chloride and 15 g of methylene chloride was added dropwise to the mixed solution. Subsequently, the resulting solution was heated to 40° C. and stirred for 6 hours, an educed salt was filtrated therefrom, and methyl chloride (the reaction solvent) was removed by distillation, thereby obtaining a desired monomer SP1. The monomer SP1 has a weight average molecular weight of about 25000 and is represented by Chemical Formula 21.

[Chemical Formula 21]

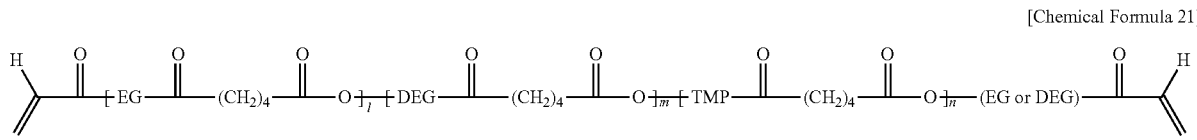

In Chemical Formula 21, l, m, and n are independently selected from 0, 1, or more, such that the monomer has a weight average molecular weight of about 25000.

Monomer Synthesis Example 2

A mixed solution was prepared by stirring 0.02 mol of polyester polyol used in Synthesis Example 1, 30 g of methylene chloride as a reaction solvent, and 0.0002 mol of dibutyltin dilaurate as a catalyst. Another mixed solution of 0.04 mol of isocyanatoethyl methacrylate and 15 g of methylene chloride was added dropwise to the mixed solution. Subsequently, the resulting solution was stirred for 6 hours at room temperature, stirred again for 2 hours at 50° C. Then an educed salt was filtered therefrom, and the reaction solvent (methylene chloride) was removed by distillation. Thus, a desired monomer SP2, having a weight average molecular weight of about 25000, was obtained, which is represented by the following Chemical Formula 22.

[Chemical Formula 22]

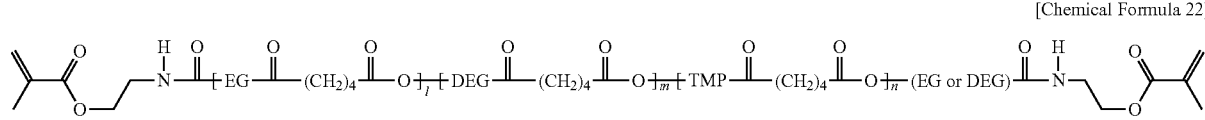

In Chemical Formula 22, l, m, and n are independently selected from 0, 1, or more, such that the monomer has a weight average molecular weight of about 25000.

Monomer Synthesis Example 3

Except for using poylesterpolyol prepared by a condensation reaction of diethylene glycol and adipic acid, the same process as described in Synthesis Example 1 was performed, thereby obtaining monomer SP3. The monomer SP3 has a weight average molecular weight of about 25000 and is represented by Chemical Formula 23.

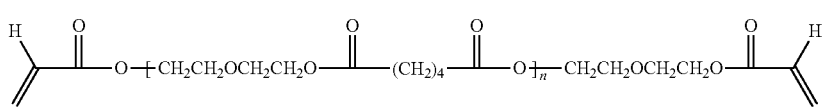

[Chemical Formula 23]

In Chemical Formula 23, n is selected from 0, 1, or more, such that the monomer has a weight average molecular weight of about 25000.

In the molecular electrolyte compositions, the content of the polymer electrolyte (the first monomer or a polymer prepared by polymerizing the first monomer and the second monomer) may be 9 to 20 wt %, and specifically 7 to 20 wt %, which will be described in further detail later.

The initiator is provided to initiate the polymerization of the monomer and thus, may be any material that can easily initiate the polymerization of the monomer and does not degrade battery performance. The initiator may be an organic peroxide, an azo compound, of a combination of one or more thereof.

Examples of the organic peroxides may include peroxy dicarbonates, such as di(4-t-butylcyclohexyl)peroxy dicarbonate, di-2-ethylhexyl peroxy dicarbonate, di-isopropyl peroxy dicarbonate, di-3-methoxy butyl peroxy dicarbonate, t-butyl peroxy isopropyl carbonate, t-butyl peroxy 2-ethyl-hexyl carbonate, 1,6-bis(t-butyl peroxycarbonyloxy)hexane, and diethylene glycol-bis(t-butyl peroxy carbonate); diacyl peroxides, such as diacetyl peroxide, dibenzoyl peroxide, dilauroyl peroxide, and bis-3,5,5-trimethyl hexanoyl peroxide; and peroxy esters, such as perhexyl pivalate, t-butyl peroxy pivalate, t-amyl peroxypivalate, t-butyl peroxy-2-ethyl-hexanoate, t-hexyl peroxy pivalate, t-butyl peroxy neodecanoate, t-butyl peroxy neoheptanoate, t-hexyl peroxy pivalate, 1,1,3,3-tetramethyl butyl peroxy neodecarbonate, 1,1,3,3-tetramethyl butyl 2-ethylhexanoate, t-amyl peroxy 2-ethyl hexanoate, t-butyl peroxy isobutyrate, t-amyl peroxy 3,5,5-trimethyl hexanoyl, t-butyl peroxy 3,5,5-trimethyl hexanoate, t-butyl peroxy acetate, t-butyl peroxy benzoate, and di-butylperoxy trimethyl adipate. Examples of the azo compounds may include 2,2'-azo-bis(isobutyronitrile), 2,2'-azo-bis(2,4-dimethylvaleronitrile), and 1,1'-azo-bis(cyanocyclohexane).

In the polymer electrolyte composition, the polymerization initiator may be presented in an amount sufficient to induce the polymerization reaction of the monomers. Generally, the content of the polymerization initiator is 0.01 to 5 wt %, based on the content of the monomer.

Generally, the polymer electrolyte composition also includes a non-aqueous organic solvent as a liquid electrolyte, and a lithium salt. The non-aqueous organic solvent may be a carbonate, an ester, an ether, or a ketone. Examples of the carbonate may include dimethyl carbonate (DMC), diethyl carbonate (DEC), dipropyl carbonate (DPC), methylpropyl carbonate (MPC), ethylpropyl carbonate (EPC), methylethyl carbonate (MEC) ethylene carbonate (EC), propylene carbonate (PC), and butylene carbonate (BC). Examples of the esters include butyrolactone (BL), decanolide, valerolactone, mevalonolactone, caprolactone, n-methyl acetate, n-ethyl acetate, and n-propyl acetate. The ether may be dibutyl ether. The ketone may be polymethylvinyl ketone. However, the present invention is not limited to the non-aqueous organic solvents listed herein.

When a carbonate-based organic solvent is used as the non-aqueous organic solvent, it may be prepared by combining a cyclic carbonate with a chain carbonate. In this case, the cyclic carbonate and the chain carbonate may be mixed in a volume ratio of 1:1 to 1:9, and specifically, 1:1.5 to 1:4. This ratio can produce an electrolyte having suitable performance.

In addition to the carbonate-based solvent, the electrolyte may include an aromatic hydrocarbon-based organic solvent, which may be an aromatic hydrocarbon-based compound. Examples of the aromatic hydrocarbon-based organic solvent may be benzene, fluorobenzene, chlorobenzene, nitrobenzene, toluene, fluorotoluene, trifluorotoluene, and xylene. In the electrolyte including the aromatic hydrocarbon-based organic solvent, a volume ratio of the carbonate-based solvent to the aromatic hydrocarbon-based solvent may be 1:1 to 30:1. This ratio can produce an electrolyte having suitable performance.

The electrolyte includes a lithium salt, which serves as a lithium ion source for basic operation of a lithium battery. The lithium salt may be $LiPF_6$, $LiBF_4$, $LiSbF_6$, $LiAsF_6$ $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(CyF_{2x+1}SO_2)$ (where, x and y are natural numbers), $LiSO_3CF_3$, or a combination thereof.

The lithium salt may have a concentration of 0.6 to 2.0 M, and specifically 0.7 to 1.6 M. When the concentration of the lithium salt is less than 0.6 M, the viscosity of the electrolyte is decreased, thereby degrading performance of the electrolyte. When the concentration of the lithium is more than 2.0 M, the viscosity of the electrolyte is increased, thereby degrading mobility of the lithium ions.

In manufacturing a lithium secondary battery using the polymer electrolyte composition, the electrode assembly 10, which is formed by a conventional method, is inserted into a battery case. The polymer electrolyte composition is added to the case, and a curing process is performed.

The curing process is widely known in the art, and thus, a detailed description thereof will be omitted. During the curing process, polymerization is initiated by the polymerization initiator. Thereby, the monomer included in the polymer electrolyte composition forms a polymer, such that the battery includes a polymer electrolyte.

The battery case may be a metal can, or a pouch formed of a metal laminate. Specifically, when the polymer electrolyte composition is applied to a battery using a pouch-type case, the performance of the polymer electrolyte composition may be maximized.

Figure 2:
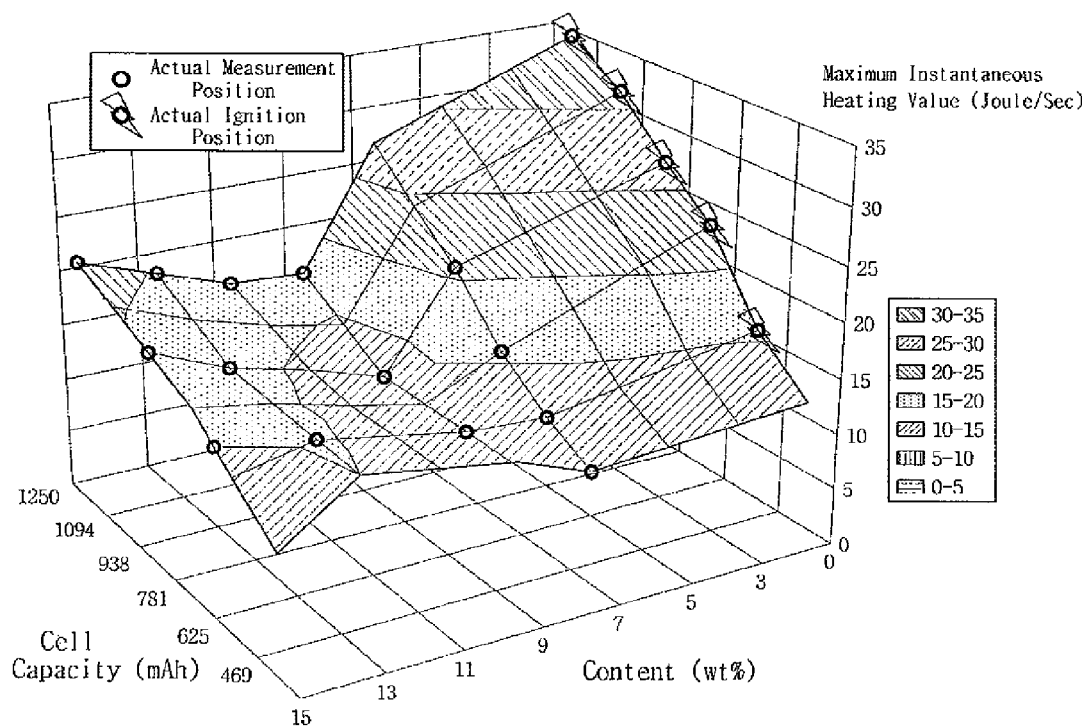
FIG. 2 is a graph illustrating a short resistance characteristic by contents of a monomer in a polymer electrolyte of a secondary battery manufactured according to Manufacturing Example 1.

Hereinafter, the safety of a secondary battery including the polymer electrolyte will be described. FIG. 2 is a graph illustrating the short resistance characteristics, according to monomers, in secondary batteries having polymer electrolytes prepared according to Manufacturing Example 1 described below. In FIG. 2, the X axis shows the content (wt %) of the polymer electrolyte, the Y axis shows the cell capacity (mAh) of the secondary batteries, and the Z axis shows the maximum instantaneous heating value (J) of secondary batteries. In FIG. 2, according to the cell content and the content of the polymer electrolyte, an actual measurement positions and ignition positions are shown. The actual measurement position refers to a position a positive electrode collector 21 is short-circuited with a negative electrode active material.

Here, when the secondary battery has a cell capacity of 1250 mAh, an electrode assembly is wound 8 times (hereinafter, 8 turns), when the secondary battery has a cell capacity of 1094 mAh, one turn is removed, when the secondary battery has a cell capacity of 938 mAh, two turns are removed, when the secondary battery has a cell capacity of 781 mAh, three turns are removed, when the secondary battery has a cell capacity of 625 mAh, four turns are removed, and when the secondary battery has a cell capacity of 469 mAh, five turns are removed. The maximum heating value will be described later.

The secondary batteries were manufactured according to the following Manufacturing Example 1.

Manufacturing Example 1

A mixed solution was prepared by adding the monomer SP1 prepared in Synthesis Example 1 to an ethylene carbonate, ethyl methyl carbonate, propylene carbonate, or fluorobenzene electrolyte solution, in which 1.3 M $LiPF_6$ was dissolved. A polymerization initiator, perhexyl pivalate, was added to the mixed solution, in an amount of 2 wt %, based on the weight of the monomer to be dissolved, thereby preparing a polymer electrolyte composition.

For example, to prepare the polymer electrolyte composition, a mixed solution was prepared by adding 7 wt % of the monomer SP1 prepared in Synthesis Example 1 to 93 wt % of the ethylene carbonate, ethyl methyl carbonate, propylene carbonate, or fluorobenzene electrolyte solution, in which 1.3 M $LiPF_6$ was dissolved. Subsequently, as shown in FIG. 2, secondary batteries were manufactured, having different monomer contents. As can be seen from FIG. 2, the content of the monomer in the polymer electrolyte was 0, 7, 9, 11, 13, or 15 wt %.

2.7 g of the polymer electrolyte composition was taken, added to an electrode assembly, and aged for 16 hours. The resulting product was sealed in a vacuum, and heated in a 70° C. oven, for 2 and a half hours, thereby manufacturing a lithium (secondary) battery. To form the positive electrodes, a mixture of $LiCoO_2$ as a positive electrode active material, ketjen black as a conductive agent, and polyvinylidene fluoride as a binder in a weight ratio of 96:2:2 was used. To form the negative electrodes, a mixture of artificial graphite as a negative electrode active material and polyvinylidene fluoride as a binder in a weight ratio of 94:6 was used.

It can be seen from FIG. 2 that when a secondary battery does not include the polymer electrolyte, regardless of the cell capacity, all of the secondary batteries were ignited at the actual measurement position. When the content of the polymer electrolyte is 7 wt % or more, none of the secondary batteries were ignited at the actual measurement position.

A relationship between the maximum instantaneous heating value and the ignition of the secondary battery will be described below. To begin with, the present inventors recognized that, when a liquid electrolyte is used, a short circuit between the positive electrode collector 21 and the negative electrode active material is the easiest to cause, leading to the ignition of the secondary battery. Here, the present inventors found that when the short circuit occurs between the positive electrode collector 21 and the negative electrode active material, a certain level of internal resistance (short resistance) is generated, and due to a heating value obtained therefrom, the secondary battery is ignited. For this reason, the inventors sought to provide a safer battery, by artificially controlling an internal resistance value (short resistance value) that generates a heating value, even if the short circuit occurs between the positive electrode collector 21 and the negative electrode active material.

Figure 3:
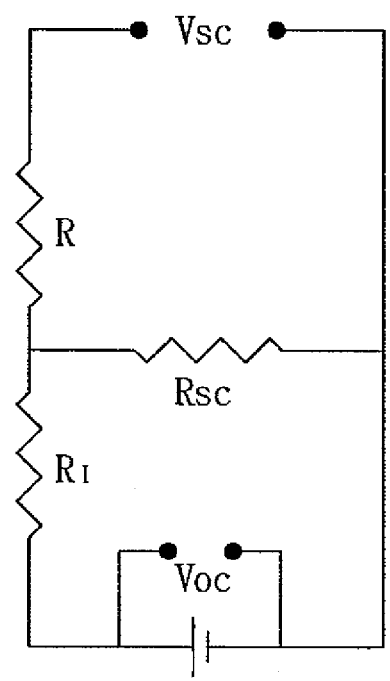
FIG. 3 is a schematic diagram of a circuit when a short circuit occurs between a positive electrode collector and a negative electrode active material.

FIG. 3 is a schematic diagram of a circuit when a short circuit occurs between the positive electrode collector 21 and a negative electrode active material. Here, the short circuit between the positive electrode collector 21 and the negative electrode active material is induced in the following manner.

To begin with, an external case of a fully-charged secondary battery is removed, a part of the positive electrode 20 is unwound, and the positive electrode active material is removed from a 5 mm×5 mm area of the partially-unwound positive electrode 20, thereby exposing a positive electrode collector 21.

Subsequently, the separator 40 is removed from a region corresponding to the exposed positive electrode collector 21, thereby exposing a negative electrode active material disposed under the separator 40. Then the partially-unwound positive electrode 20 is rewound.

As described above, pressure was applied to the exposed positive electrode collector and negative electrode active material, using a 0.5 mm shorting pin. A short voltage was then measured.

In FIG. 3, $V_{OC}$ is an open circuit voltage, $V_{SC}$ is a short circuit voltage, $R_1$ is a specific resistance of the secondary battery, $R_{SC}$ is a short circuit resistance, and R is a specific resistance of the shorting pin.

As can be seen from FIG. 3, Voc is expressed as follows.

$$V_{OC} = I * R_{TOTAL} = I * (R_1 + R_{SC} + R) \quad (1)$$

In Formula (1), I is expressed as follows.

$$I = \frac{V_{oc}}{R_1 + R_{sc} + R} \quad (2)$$

Meanwhile, the heating value W is expressed as follows.

$$W = I^2 R_{SC} \quad (3)$$

The following Equation 1 can be derived From Formulae (2) and (3).

$$W = \left(\frac{V_{oc}}{R_1 + R_{sc} + R}\right)^2 * R_{sc} \quad \text{[Equation 1]}$$

Meanwhile, $V_{SC}$ is expressed as follows.

$$V_{SC} = I * R_{SC} \quad (4)$$

The following Equation 2 is derived from Formulae (4) and (1).

$$R_{sc} = \frac{V_{sc}(R_1 + R)}{V_{oc} - V_{sc}} \qquad [\text{Equation 2}]$$

As can be seen from Equation 2, $R_{SC}$ can be defined by $V_{SC}$. As can be seen from Equation 1, the heating value W can be defined by $R_{SC}$. A principle of improving battery safety by controlling an internal resistance (short resistance) according to aspects of the present invention will be explained.

Figure 4A:
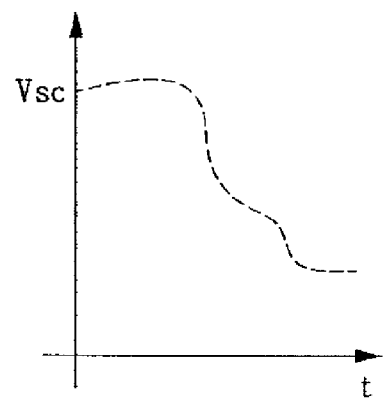
FIG. 4A is a graph illustrating an change in $V_{SC}$ according to time (t)
Figure 4B:
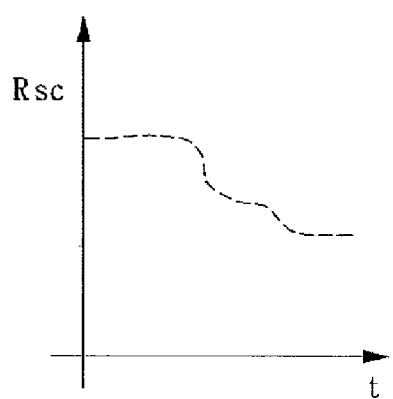
FIG. 4B is a graph illustrating a change in $R_{SC}$ according to time (t)
Figure 4C:
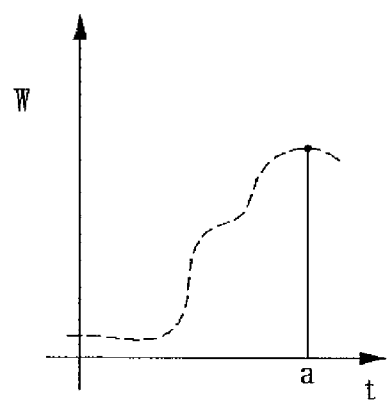
FIG. 4C is a graph illustrating a change in heating value (W) according to time.

FIG. 4A is a graph illustrating changes in $V_{SC}$ according to time (t). The changes in $V_{SC}$ are measured using a voltmeter. FIG. 4B is a graph illustrating changes in $R_{SC}$ according to time (t). The changes in $R_{SC}$ according to time can be calculated by applying the changes in $V_{SC}$ according to time of FIG. 4A, to Equation 2. FIG. 4C is a graph illustrating a change in heating value (W) according to time (t). The changes in heating value according to time can be calculated by applying the changes in $R_{SC}$ according to time of FIG. 4B to Equation 1.

Here, changes in heating value (W) according to time include the time (a), where the heating value is highest. Hereinafter, this heating value is referred to as a "maximum instantaneous heating value."

Meanwhile, as described above, the changes in heating value (W) according to time may be calculated using the changes in $R_{SC}$ according to time. According to aspects of the present invention, an $R_{SC}$ value at the time having the maximum instantaneous heating value is defined as a "critical short resistance.

Figure 5:
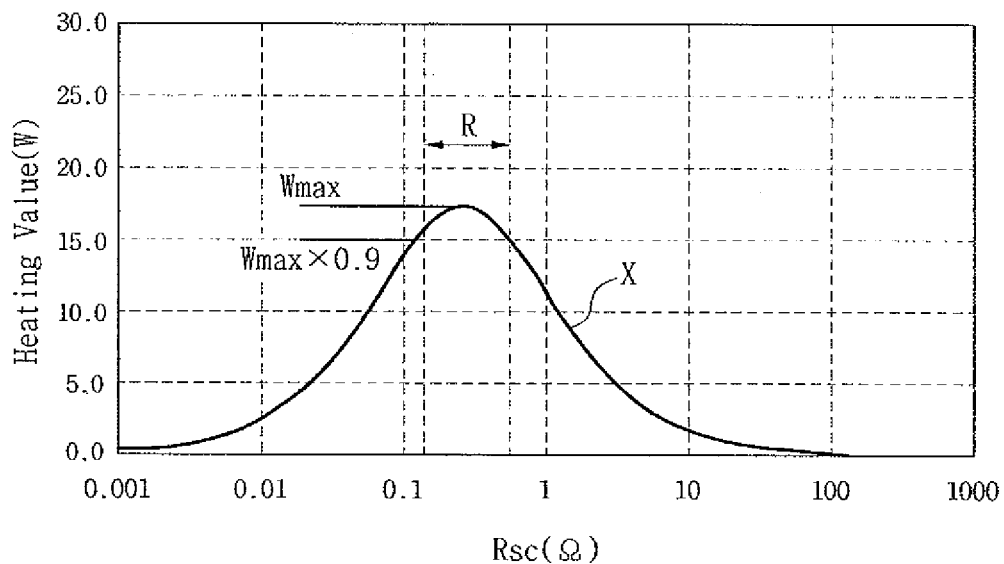
FIG. 5 is a graph illustrating a relationship between the short resistance and the total heating value.

FIG. 5 is a graph illustrating a relationship between the short resistance $R_{SC}$ and the heating value W. Generally, when a short circuit occurs, the heating value W is increased, due to the resistance value at the position where the short circuit occurs, leading to thermal runaway. Here, the heating value continuously increases for a certain time period and then decreases. Thus, the heating value W increases, until the point (time) which the maximum instantaneous heating value occurs.

The total heating value according to time (heat value per unit time) also continuously increases for a certain time period and then decreases. Thus, the increase in total heating value continues until the maximum instantaneous heating value is reached. However, such thermal runaway abruptly occurs, when the maximum instantaneous heating value is present around the region (time period) in which the total heating value according to time is at the highest level, and does not occur when the maximum instantaneous heating value is present in the region in which the total heating value is low.

In other words, when the short resistance $R_{SC}$ is at a very low or high level, the total heating value according to time (heating value per unit time) decreases. Accordingly, when the maximum instantaneous heating value is present in the region having the low heating value per unit time, the thermal runaway does not occur. Region R shown in FIG. 5 a region having heating value per unit time which is more than 90% of the maximum heating value per unit time (Wmax) is defined as the region (time period) in which the thermal runaway abruptly occurs, and is referred to as an "$R_{SC}$ range having an ignition risk."

The critical short resistance described above is disposed in a region excluding the "$R_{SC}$ range having an ignition risk" shown in FIG. 5, to ensure battery safety. In other words, the critical short resistance refers to the Rsc value at the time when the maximum instantaneous heating value occurs. The critical short resistance is in the region excluding the "$R_{SC}$ range having an ignition risk," and thereby the maximum instantaneous heating value may be in the region having a lower level of the total heating value according to time.

To this end, an internal resistance is artificially controlled for the critical short resistance to be present in the region excluding the "$R_{SC}$ range having an ignition risk," by adding the polymer electrolyte as described above to the polymer electrolyte composition, at a certain content. Thus, even though a positive electrode collector is short-circuited with the negative electrode active material, which is in the most vulnerable mode to an internal short circuit, battery safety can be ensured by inhibiting the thermal runaway.

Meanwhile, as described above, it can be seen from FIG. 2 that when the polymer electrolyte is not included, regardless of the cell capacity, all secondary batteries are ignited at the actual measurement position. When the content of the polymer electrolyte is 7 wt % or more, no secondary batteries are ignited at the actual measurement position.

The actual measurement position and the actual ignition position each include the maximum instantaneous heating values. Here, even when the content of the polymer electrolyte is 7 wt % or more, none of the secondary batteries are ignited. This is because the critical short resistance (i.e., the $R_{SC}$ value) at the time when the maximum instantaneous heating value is present is designed to be present in the region excluding the "$R_{SC}$ range having an ignition risk" shown in FIG. 5. That is, a critical short circuit is artificially controlled by adding a certain amount of the polymer electrolyte. Thus, the battery safety is improved.

When the cell capacity was 1250 mAh, and the polymer electrolyte was contained in an amount of 15, 13, 11, 9, or 0 wt %, the positive electrode collector was short-circuited with the negative electrode active material, and the maximum instantaneous heating value was measured. As a result, the maximum instantaneous heating value was different, and thus, the critical short resistance was different. When the polymer electrolyte was contained in an amount of 15, 13, 11, or 9 wt %, the critical short resistance was present in the region excluding the "$R_{SC}$ range having an ignition risk," as shown in FIG. 5, so that the battery was not ignited. However, when no polymer electrolyte was contained, the critical short resistance was present in the "$R_{SC}$ range having an ignition risk," so that the battery was ignited.

Meanwhile, comparing a case in which the cell capacity was 938 mAh and the polymer electrolyte was contained at 7 wt %, and a case in which the cell capacity was 469 mAh and no polymer electrolyte was contained, the former case had a higher level of the maximum instantaneous heating value than the latter case. However, in the former case, the battery was not ignited, and in the latter case, the battery was ignited. As a result, it can be seen that the ignition of the battery is not determined by the maximum instantaneous heating value, but by whether the critical short resistance value is present in the "$R_{SC}$ range having an ignition risk."

Figure 6A:
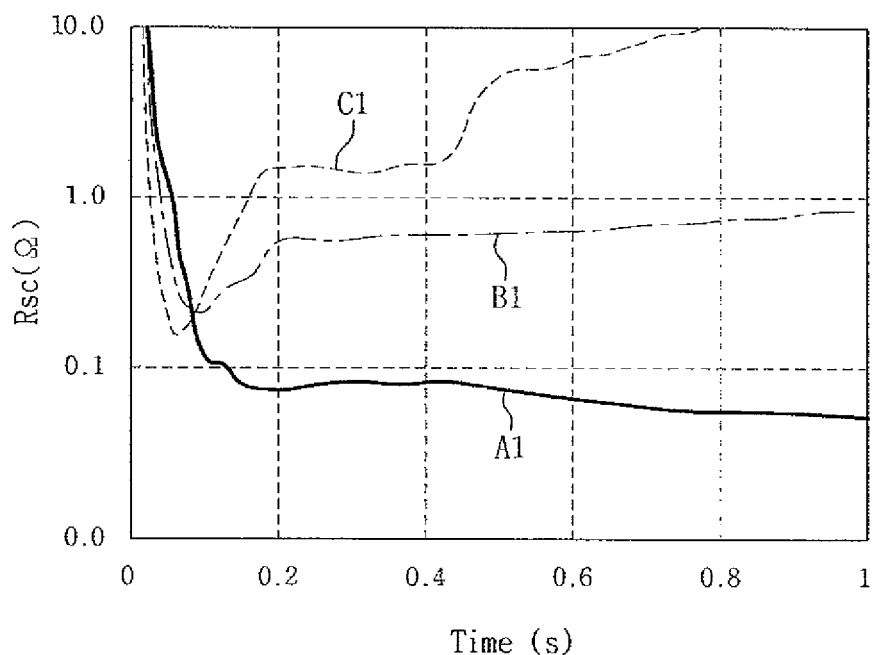
FIG. 6A is a graph illustrating a change in $R_{SC}$ according to time (t), when the content of a polymer electrolyte is 5 wt %.

FIG. 6A is a graph illustrating a change in $R_{SC}$ according to time (t), when the content of the polymer electrolyte is 5 wt %. In FIG. 6A, A1 is a secondary battery having a cell capacity of 469 mAh (that is, 5 turns are removed), B1 is a secondary battery having a cell capacity of 625 mAh (that is, 4 turns are removed), and C1 is a secondary battery having a cell capacity of 781 mAh (that is, 3 turns are removed). As shown in FIG. 6A, the change in $R_{SC}$ according to time (t) may be measured by applying changes in $V_{SC}$ to Equation 2.

Figure 6B:
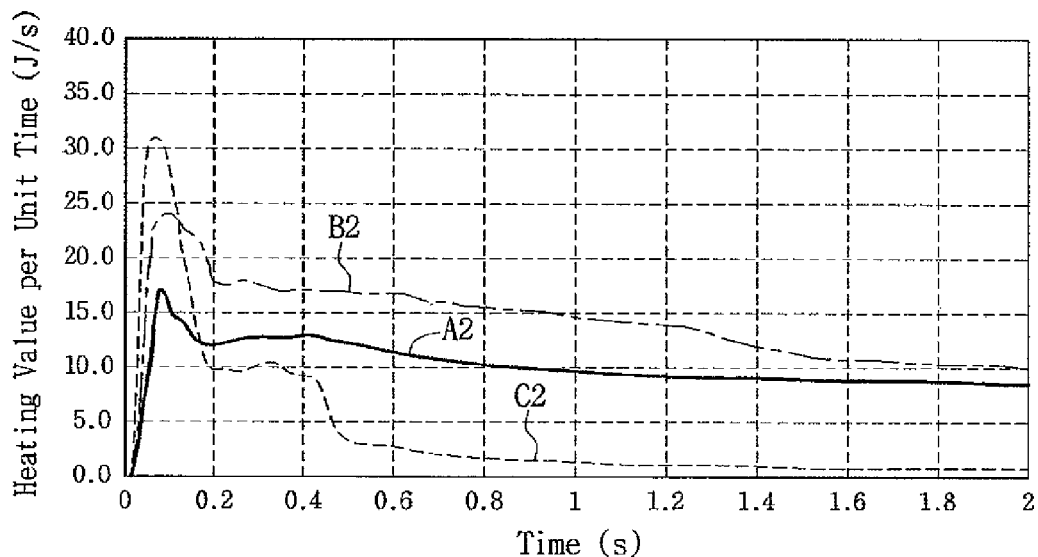
FIG. 6B is a graph illustrating a change in heating value according to time, when the content of the polymer electrolyte is 5 wt %.

FIG. 6B is a graph illustrating a change in heating value W according to time (t), when the content of the polymer electrolyte is 5 wt %. In FIG. 6B, A2 is a secondary battery having a cell capacity of 469 mAh (that is, 5 turns are removed), B2 is a secondary battery having a cell capacity of 625 mAh (that is, 4 turns are removed), and C2 is a secondary battery having a cell capacity of 781 mAh (that is, 3 turns are removed).

Changes in heating value W according to time may be measured by applying the change in Rsc according to time of FIG. 6A to Equation 1. Referring to FIG. 6B, each secondary battery includes the time where the maximum instantaneous heating value is present, and the $R_{SC}$ value at the maximum instantaneous heating value corresponds to the critical short resistance.

Figure 6C:
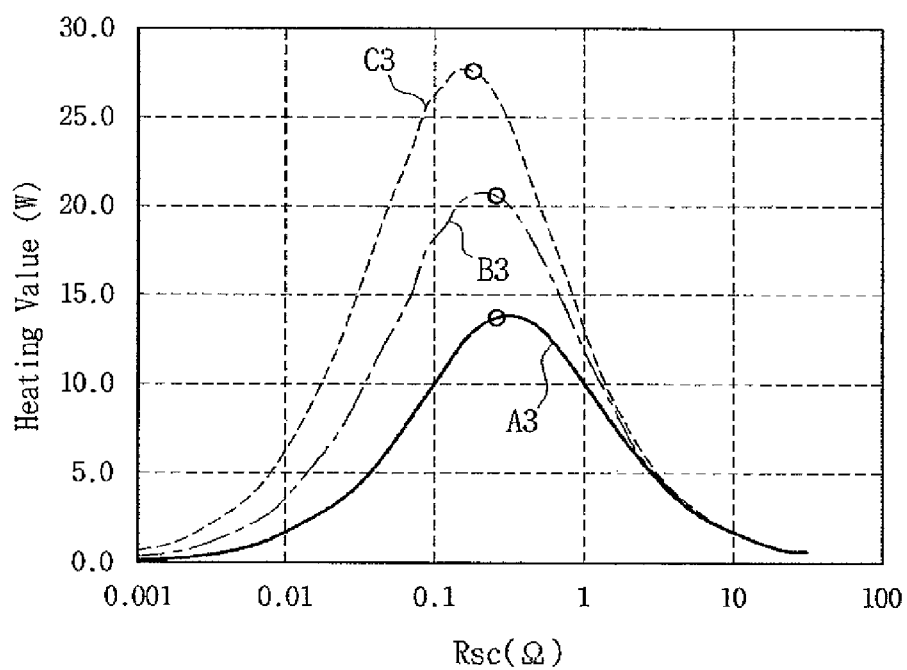
FIG. 6C is a graph illustrating a relationship between the short resistance and the heating value, when the content of the polymer electrolyte is 5 wt %.

FIG. 6C is a graph illustrating a relationship between the short resistance $R_{SC}$ and the heating value W when the content of the polymer electrolyte is 5 wt %. In FIG. 6C, A3 is a secondary battery having a cell capacity of 469 mAh (that is, 5 turns are removed), B3 is a secondary battery having a cell capacity of 625 mAh (that is, 4 turns are removed), and C3 is a secondary battery having a cell capacity of 781 mAh (that is, 3 turns are removed).

Referring to FIG. 6C, each secondary battery includes the critical short resistance, that is, the $R_{SC}$ value at the maximum instantaneous heating value indicated by the circle, and the critical short resistance is present in the "$R_{SC}$ range having an ignition risk." In other words, as can be seen from FIGS. 6A to 6C, when the content of the polymer electrolyte is 5 wt % or less, the critical short resistance is present in the "$R_{SC}$ range having an ignition risk," so that the battery safety is not be improved. For this reason, in Manufacturing Example 1, it is preferable that the content of the polymer electrolyte is 7 wt % or more.

In addition, the secondary batteries according to Manufacturing Example 1 may contain the polymer electrolyte at 20 wt % or less. The polymer electrolyte is added to a cell in a monomer state, and polymerized into a gel, by curing after assembly. However, when the content of the polymer electrolyte is more than 20 wt %, the viscosity of the polymer electrolyte composition becomes so high that the impregnating ability of an electrode plate is not good during the addition of the polymer electrolyte, and the polymerization is not uniformly performed. This creates localized non-polymerized regions that decrease ionic conductivity of the polymer electrolyte composition. Thus, the secondary battery cannot ensure high charge and discharge rates.

Accordingly, the secondary battery according to Manufacturing Example 1 may contain the polymer electrolyte at 7 to 20 wt %, based on the total weight of the polymer electrolyte composition.

A secondary battery was manufactured according to the following Manufacturing Example 2.

Manufacturing Example 2

A mixed solution was prepared by adding the monomer SP1 prepared in Synthesis Example 1 to an ethylene carbonate, ethyl methyl carbonate, propylene carbonate, or fluorobenzene electrolyte solution, in which 1.3 M $LiPF_6$ was dissolved. A polymerization initiator, perhexyl pivalate, was dissolved into the mixed solution in an amount of 2 wt %, based on the weight of the monomer, thereby preparing a polymer electrolyte composition.

For example, to prepare the polymer electrolyte compositions, a mixed solution was prepared by adding 7 wt % of the monomer SP1 to 93 wt % of the ethylene carbonate, ethyl methyl carbonate, propylene carbonate, or fluorobenzene electrolyte solution, in which 1.3 M $LiPF_6$ was dissolved. Subsequently, a secondary battery was manufactured while changing the content of the monomer. Here, the amount of the monomer in the polymer electrolyte was 5, 7, or 9 wt %.

2.7 g of the polymer electrolyte composition was added to an electrode assembly, and aged for 16 hours. The resulting product was sealed in a vacuum, and heated in a 70° C. oven for 2 and a half hours, thereby manufacturing a lithium (secondary) battery. To form a positive electrode, a mixture of $LiCoO_2$ as a positive electrode active material, ketjen black as a conductive agent, and polyvinylidene fluoride as a binder, in a weight ratio of 96:2:2, was used. To form a negative electrode, a mixture of artificial graphite as a negative electrode active material and styrene-butadiene rubber as a binder, in a weight ratio of 94:6, was used.

In other words, the polyvinylidene fluoride was used as the binder of the negative electrodes, in Manufacturing Example 1. However, in Manufacturing Example 2, styrene-butadiene rubber was used as the binder of the negative electrodes.

Figure 7A:
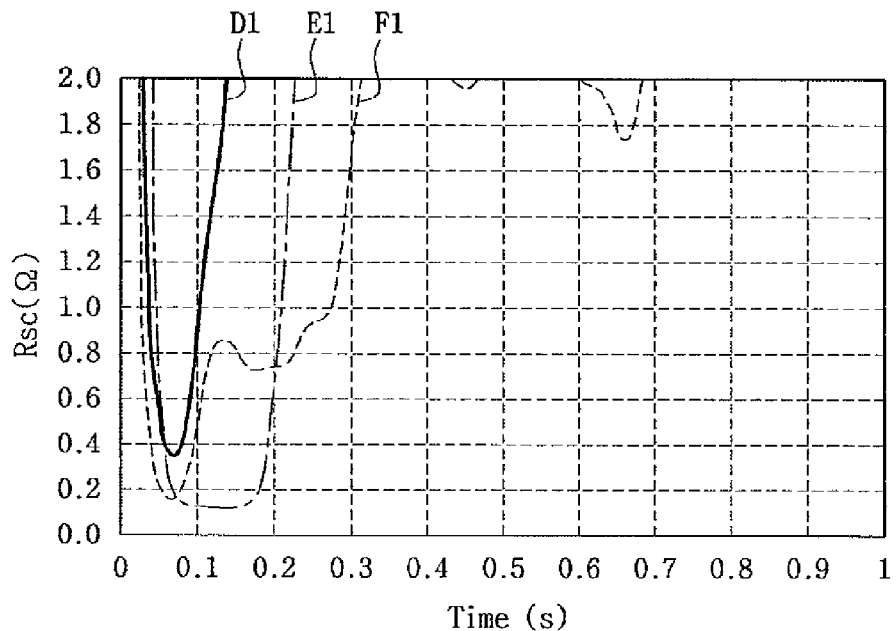
FIG. 7A is a graph illustrating a change in $R_{SC}$ according to time (t) of a secondary battery manufactured according to Manufacturing Example 2.
Figure 7B:
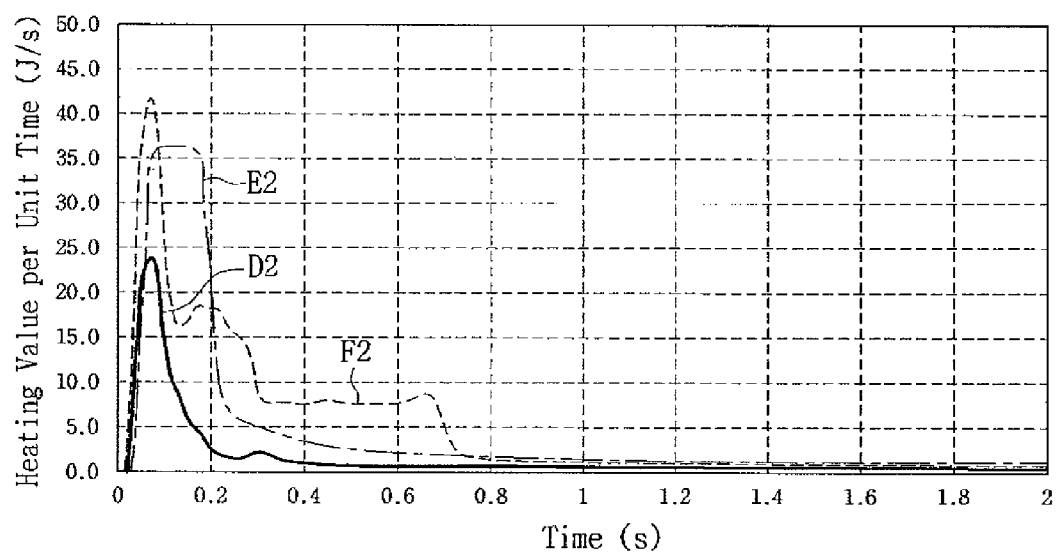
FIG. 7B is a graph illustrating a change in heating value according to time (t) of the secondary battery manufactured according to Manufacturing Example 2.
Figure 7C:
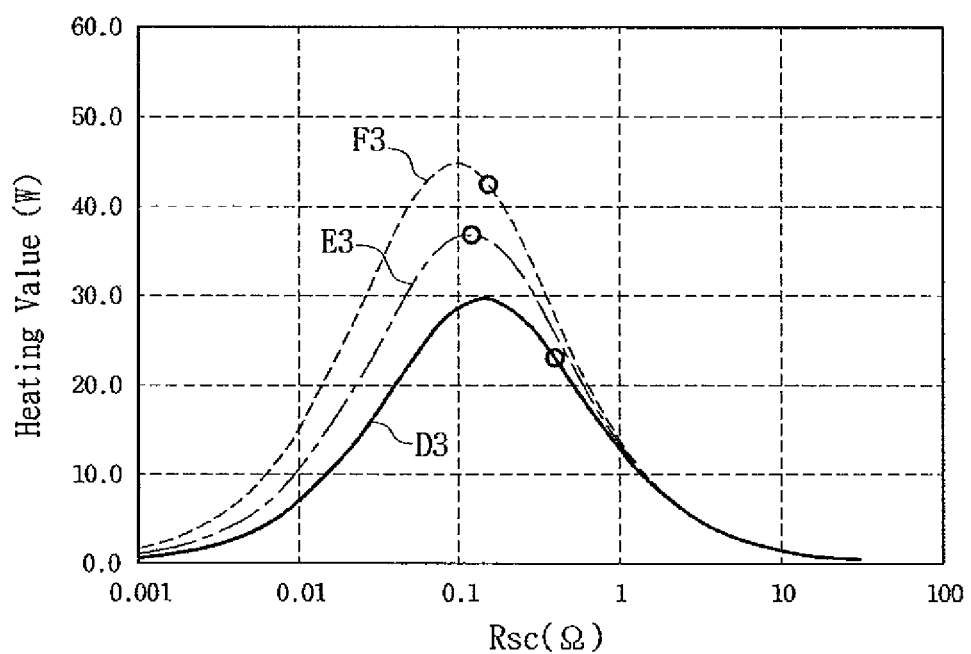
FIG. 7C is a graph illustrating a relationship between the short resistance and the heating value of the secondary battery manufactured according to Manufacturing Example 2.

FIGS. 7A to 7C illustrate safety of the secondary batteries manufactured in Manufacturing Example 2. Here, the secondary batteries shown in FIGS. 7A to 7C had a cell capacity of 781 mAh (that is, 3 turns were removed).

FIG. 7A is a graph illustrating a change in $R_{SC}$ according to time (t), of the secondary batteries manufactured in Manufacturing Example 2. In FIG. 7A, D1 is a secondary battery containing 9 wt % of the polymer electrolyte, E1 is a secondary battery containing 7 wt % of the polymer electrolyte, and F1 is a secondary battery containing 5 wt % of the polymer electrolyte. As shown in FIG. 7A, the change in $R_{SC}$ according to time (t) may be calculated by applying changes in $V_{SC}$ to Equation 2.

FIG. 7B is a graph illustrating changes in heating value W according to time (t), of the secondary batteries manufactured according to Manufacturing Example 2. In FIG. 7B, D2 is a secondary battery containing 9 wt % of the polymer electrolyte, E2 is a secondary battery containing 7 wt % of the polymer electrolyte, and F2 is a secondary battery containing 5 wt % of the polymer electrolyte. The change in heating value W according to time may be calculated by applying changes in $R_{SC}$ according to time, as illustrated in FIG. 7A, to Equation 1. Referring to FIG. 7B, each secondary battery includes the time having the maximum instantaneous heating value, and the $R_{SC}$ value at the maximum instantaneous heating value corresponds to the critical short resistance.

FIG. 7C is a graph illustrating a relationship between the short resistance $R_{SC}$ and the heating value W of the secondary batteries manufactured according to Manufacturing Example 2. In FIG. 7C, D3 is a secondary battery containing 9 wt % of the polymer electrolyte, E3 is a secondary battery containing 7 wt % of the polymer electrolyte, and F3 is a secondary battery containing 5 wt % of the polymer electrolyte.

Referring to FIG. 7C, each secondary battery includes the critical short resistance indicated by the circle (that is, the $R_{SC}$ value at the maximum instantaneous heating value). Here, it can be seen that, in the case of D3 containing 9 wt % of the polymer electrolyte, the critical short resistance is present in a region excluding a "$R_{SC}$ range having an ignition risk." However, in the cases of E3 and F3 containing 7 and 5 wt % of the polymer electrolytes, respectively, the critical short resistances are present in the "$R_{SC}$ range having an ignition risk."

In other words, as can be seen from FIGS. 7A to 7C, when a secondary battery contains 7 wt % or less of the polymer electrolyte, the critical short resistance is present in the "$R_{SC}$ range having an ignition risk," and thus, the battery safety is not be improved. For this reason, in Manufacturing Example 2, the content of the polymer electrolyte may be 9 wt % or more. Moreover, the secondary batteries according to Manufacturing Example 2 may contain the polymer electrolyte at 20 wt % or less.

The polymer electrolyte is added to the cells in a monomer state, and polymerized into a gel by curing, after assembly. However, when the content of the polymer electrolyte is more than 20 wt %, the viscosity of the polymer electrolyte composition interferes with the impregnation of the polymer electrolyte composition into an electrode plate, during the addition of the polymer electrolyte. The polymerization is also not uniform, thereby creating localized non-polymerized regions and decreasing ionic conductivity of the polymer electrolyte composition. Thus, the secondary battery may not exhibit high charge and discharge rates.

As a result, the secondary batteries according to Manufacturing Example 2 of the present invention may contain 9 to 20 wt % of the polymer electrolyte, based on the total weight of the polymer electrolyte composition.

Consequently, aspects of the present invention can provide a secondary battery in which improved safety can be ensured, by artificially controlling an internal resistance value (short resistance value) generating a heating value, even if a short circuit occurs in the secondary battery.

Although a few exemplary embodiments of the present disclosure have been shown and described, it would be appreciated by those skilled in the art that changes may be made in these exemplary embodiments, without departing from the principles and spirit of the present disclosure, the scope of which is defined in the claims and their equivalents.

What is claimed is:

1. A method of controlling a short resistance of a secondary battery, comprising:

measuring an open circuit voltage ($V_{OC}$) of the secondary battery;

calculating a short circuit resistance ($R_{SC}$) using the measured open circuit voltage ($V_{OC}$);

calculating a heating value W according to time using the calculated short circuit resistance ($R_{SC}$);

calculating a time having the maximum instantaneous heating value, using the change in heating value (W) according to time, determining the short circuit resistance ($R_{SC}$) value at the time having the maximum instantaneous heating value as a critical short resistance; and adjusting an amount of a polymer electrolyte used in the secondary battery, according to the determined critical short resistance.

2. The method according to claim 1, wherein the adjusting of the amount comprises adjusting the amount of the polymer electrolyte, such that the critical short resistance is not included in an $R_{SC}$ range having an ignition risk.

3. The method according to claim 2, wherein the $R_{SC}$ range having an ignition risk occurs while the total heating value according to time is within 90% of the maximum level of the total heating value according to time.

4. The method according to claim 1, wherein the heating value satisfies Equation 1:

$$W = \left(\frac{V_{oc}}{R_1 + R_{sc} + R}\right)^2 * R_{sc}, \quad \text{[Equation 1]}$$

wherein $V_{OC}$ is an open circuit voltage, $R_1$ is a specific resistance of the secondary battery, $R_{SC}$ is a short circuit resistance, and R is a specific resistance of a shorting pin.

5. The method according to claim 4, wherein calculating of the heating value (W) according to time is performed by applying changes in the short circuit resistance ($R_{SC}$) according to time to Equation 1.

6. The method according to claim 1, wherein the short circuit resistance ($R_{SC}$) satisfies Equation 2:

$$R_{sc} = \frac{V_{sc}(R_1 + R)}{V_{oc} - V_{sc}}, \quad \text{[Equation 2]}$$

wherein $V_{OC}$ is an open circuit voltage, $V_{SC}$ is a short circuit voltage, $R_1$ is a specific resistance of the secondary battery, and R is a specific resistance of a shorting pin.

7. The method according to claim 6, wherein the calculating of the short circuit resistance ($R_{SC}$) is performed by applying changes in the measured open circuit voltage to Equation 2.

8. The method according to claim 1, wherein a positive electrode collector and a negative electrode active material layer are short-circuited in the secondary battery.

* * * * *